(12) United States Patent
Sugimoto et al.

(10) Patent No.: US 7,869,065 B2
(45) Date of Patent: Jan. 11, 2011

(54) IMAGE FORMING APPARATUS (75) Inventors: Eiji Sugimoto, Hino (JP); Hideo Yamane, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 980 days.

(21) Appl. No.: 11/714,528

(22) Filed: Mar. 6, 2007

(65) Prior Publication Data
US 2007/0279646 A1 Dec. 6, 2007

(30) Foreign Application Priority Data
May 30, 2006 (JP) .............................. 2006-149480

(51) Int. Cl.
*G06F 3/12* (2006.01)
(52) U.S. Cl. .................... 358/1.13; 358/1.14; 358/1.15; 399/407; 399/410; 270/4; 270/22.1; 270/58.01
(58) Field of Classification Search ....... 358/1.13–1.18; 399/407, 410; 270/4, 22.1, 58.01
See application file for complete search history.

(56) References Cited

U.S. PATENT DOCUMENTS 7,240,898 B2 * 7/2007 Takamura et al. ........ 270/58.09

7,450,875 B2 * 11/2008 Watanabe et al. ............. 399/88
2007/0170635 A1 * 7/2007 Saitsu et al. ............. 270/58.08
2008/0019725 A1 * 1/2008 Iida et al. ...................... 399/75

FOREIGN PATENT DOCUMENTS

JP 2001-96849 4/2001
JP 2005-246870 9/2005

* cited by examiner

*Primary Examiner*—Chan S Park
(74) *Attorney, Agent, or Firm*—Cantor Colburn LLP (57) ABSTRACT

An image forming system includes an image forming device having an image forming section that forms image on a recording medium based on image information and ejects the recording medium; a post-processing device that performs post-processing on a recording medium, the post-processing device having a sheet feeding section to load the recording medium; a power switching device to turn on power to the image forming system; a post-processing operation setting device for setting post-processing dedicated mode to execute post-processing on the recording medium loaded on the sheet feeding section; and a controller that executes startup operation for setting only the post-processing device into an operable state and prohibits startup operation of the image forming section of the image forming device when power has been turned on via the power switching device and the controller has detected that the post-processing dedicated mode has been set via the post-processing operation setting device.

12 Claims, 3 Drawing Sheets

IMAGE FORMING APPARATUS

This application is based on Japanese Patent Application No. 2006-149480 filed on May 30, 2006 in Japanese Patent Office, the entire content of which is hereby incorporated by reference.

FIELD OF THE INVENTION

The present invention relates to an image forming system provided with a post-processing device for post-processing on a recording medium, an image forming device for image forming, and the like.

BACKGROUND OF THE INVENTION

Many of the recent image forming devices are constructed as printers, copiers, facsimile devices, and multifunction centers, and are integrated with a post-processing device to collaborate with each other, thereby building image forming systems.

Such an image forming system forms images on recording mediums, based on image information, and can subsequently or thereafter perform post-processing on the recording mediums, as necessary, such as punching, stapling, folding, sorting.

In order to bring such an image forming system into an operative state, in general, when a power switch provided on the image forming device side is switched on, warming-up of a fixing device of the image forming device is performed and necessary initial setting and the like are carried out through information exchange with the post-processing device. Thus, the image forming device is brought into an operative state. Likewise, the post-processing device is subjected to necessary initial setting and the like so as to be brought into an operable state for startup.

When a series of preset starting operations have been completed, information on conditions and a mode related to desired image forming is set, or information on conditions and a mode related to post-processing is set via an operation input unit provided on the image forming device or post-processing device, and thereby desired operation of image forming or post-processing is performed.

Under control of such an image forming system in a prior art, only the post-processing device is used to perform post-processing on recording mediums. However, an image forming system in a prior art enables using the post-processing device only after startup of both the image forming device and post-processing device. Accordingly, as a result of startup of both the image forming device and post-processing device, unnecessary warming-up of the fixing device of the image forming device or the like is started, and, various initial settings for forming images with the image forming device are executed. In such a manner, it is impossible to avoid waste of time taken prior to startup of the post-processor which a user wants to use quickly, and to avoid consumption of energy for wasteful power or the like.

In prior arts, in order to avoid waste of time, energy, etc. in this situation, for example, a technology is disclosed in which when power of a printing device is turned on quickly after the power of the printing device is turned off, density adjustment of the printing device is not performed, and printing operation quickly becomes available so as to shorten the time (for example, see Patent Document 1: Japanese Patent Publication TOKKAI No. 2001-96849).

Further, there is also disclosed a technology as described below (for example, see Patent Document 2: Japanese Patent Publication TOKKAI No. 2005-246870). That is, while power of an image forming device is on, power is normally supplied to respective control sections as a normal mode. However, in a case, for example, where if operation of the image forming device has not been carried out for a predetermined time and accordingly the mode turns to a sleep mode for power saving, power supply is cut off except for specific control sections and power supply systems necessary for releasing the sleep, and on the other hand, power is only supplied to a control sections and power supply system necessary for manual post-processing in a case where power supply is not necessary for the entire system, for example, for manual post-processing that allows only post-processing during execution of the sleep mode.

However, the technology disclosed in Patent Document 1 has the following problem. If power of a printing device is turned on quickly after the power of the printing device is turned off, the time between turning on and turning off of the power is short. Consequently, according to the technology disclosed in Patent Document 1, density adjustment having been set in advance before turning off the power is determined to be effective and reused. In other words, density adjustment of the printing device is not performed again after it has been once performed at the time of turning on the power, which is aimed at reduction in time so that printing can be performed quickly. Accordingly, when the power is turned on initially, it is necessary to start up the entire device to an operative state and execute density adjustment etc., wherein the technology is not aimed at a reduction in time nor waste of energy required for startup operation upon initial power-on.

In the technology disclosed in Patent Document 2, when an image forming device is moved to a sleep mode, power is only supplied to a control section and a power system necessary for performing manual post-processing, if it is not necessary to supply power to the entire system. Same as the technology by Patent Document 1, reduction in time nor waste of energy required for startup operation upon initial power-on is not achieved.

As described above, in the technologies by Patent Document 1 and Patent Document 2, even in a case where some of the devices of a system will not be used in the meantime, it is necessary to start up all the devices into an operable state by supplying power to the entire system in order to start up a device with initial power-on, causing a problem of taking time for startup operation and thus causing a waste of energy, such as power.

Considering problems including the above, an object of the invention is to provide an image forming system that reduces the time for startup of a post-processing unit when only the post-processor is to be used, and prevents waste of unnecessary power and the like so as to realize energy saving.

SUMMARY OF THE INVENTION

To solve a problem, as described above, in an aspect of the invention, there is provided an image forming system, including:

an image forming device having an image forming section that forms an image on a recording medium based on image information and ejects the recording medium;

a post-processing device that performs post-processing on a recording medium, the post-processing device having a sheet feeding section to load the recording medium;

a power switching device to turn on power to the image forming system;

a post-processing operation setting device for setting a post-processing dedicated mode to execute post-processing on the recording medium loaded on the sheet feeding section; and a controller that executes startup operation for setting only the post-processing device into an operable state and prohibits startup operation of the image forming section of the image forming device when power has been turned on via the power switching device and the controller has detected that the post-processing dedicated mode has been set via the post-processing operation setting device.

DETAIL DESCRIPTION OF THE PREFERRED EMBODIMENT

The present invention will be described below in details, referring to the drawings, however, the invention is not limited thereto. In the respective drawings, the same reference symbols represent the same elements, and details will be described, referring to other related drawings, as necessary.

Figure 1:
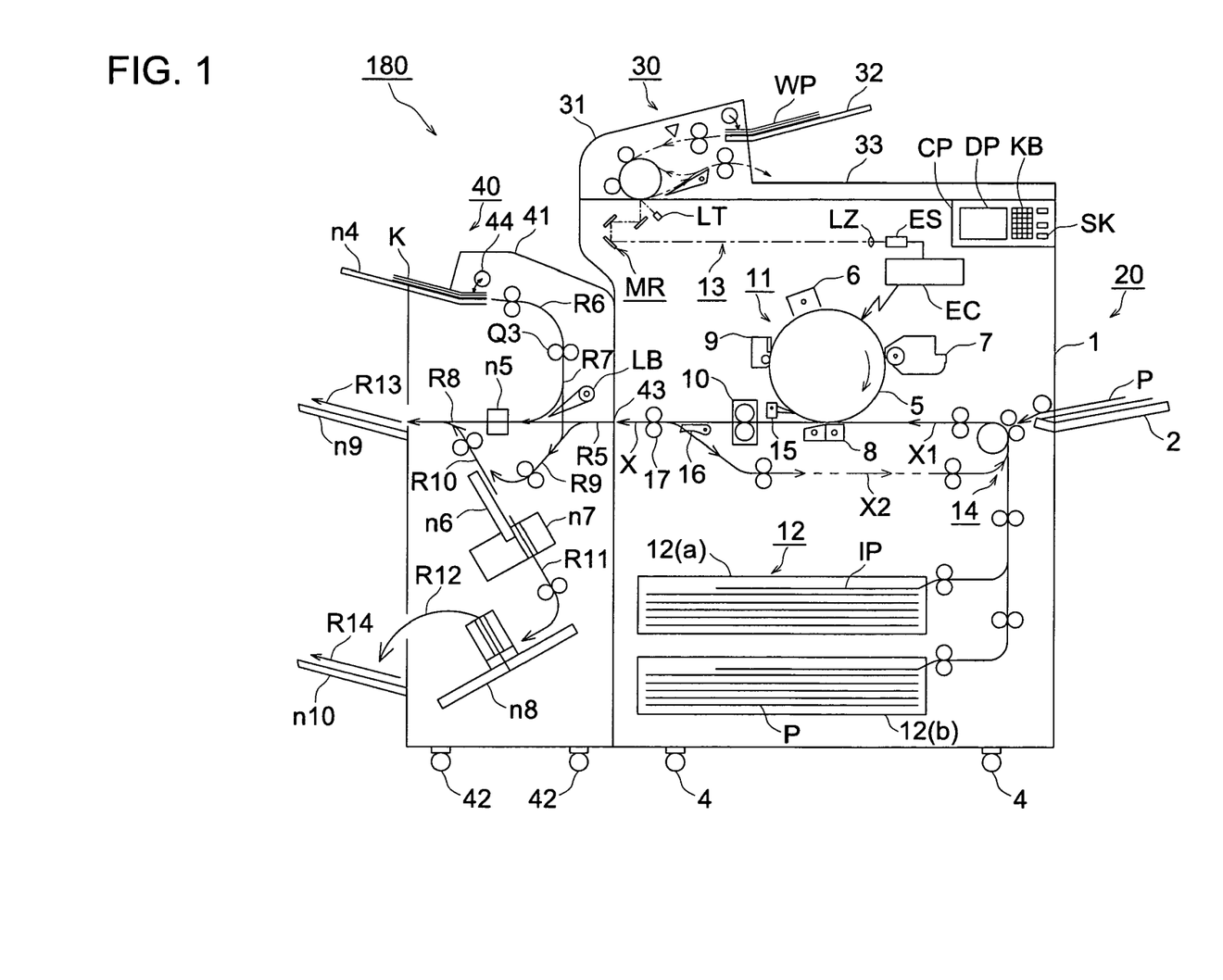
FIG. 1 is a schematic view of an image forming system in an embodiment of the invention.
Figure 2:
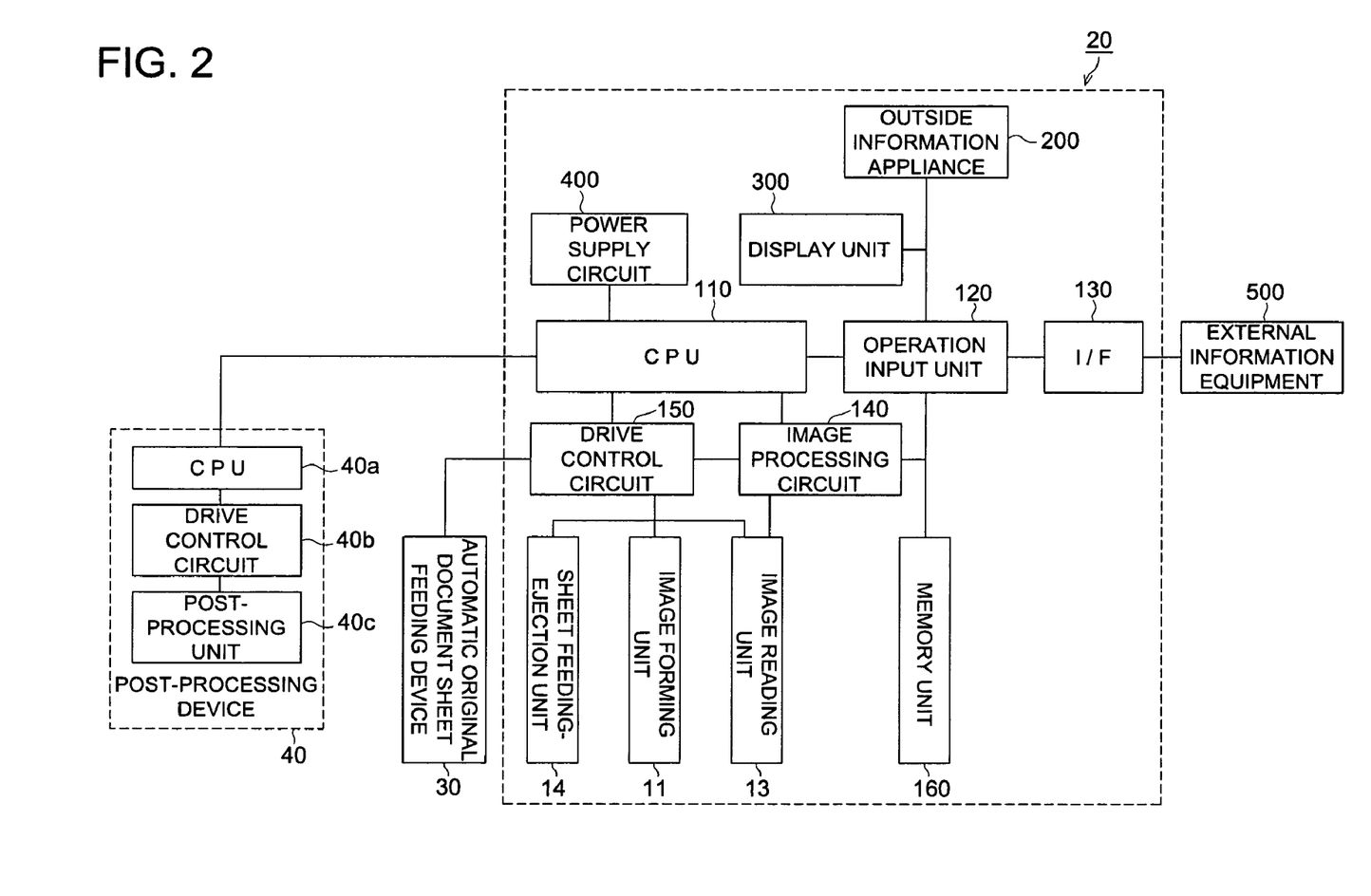
FIG. 2 is a block diagram showing a circuit structure of the image forming system in the above embodiment of the invention.
Figure 3:
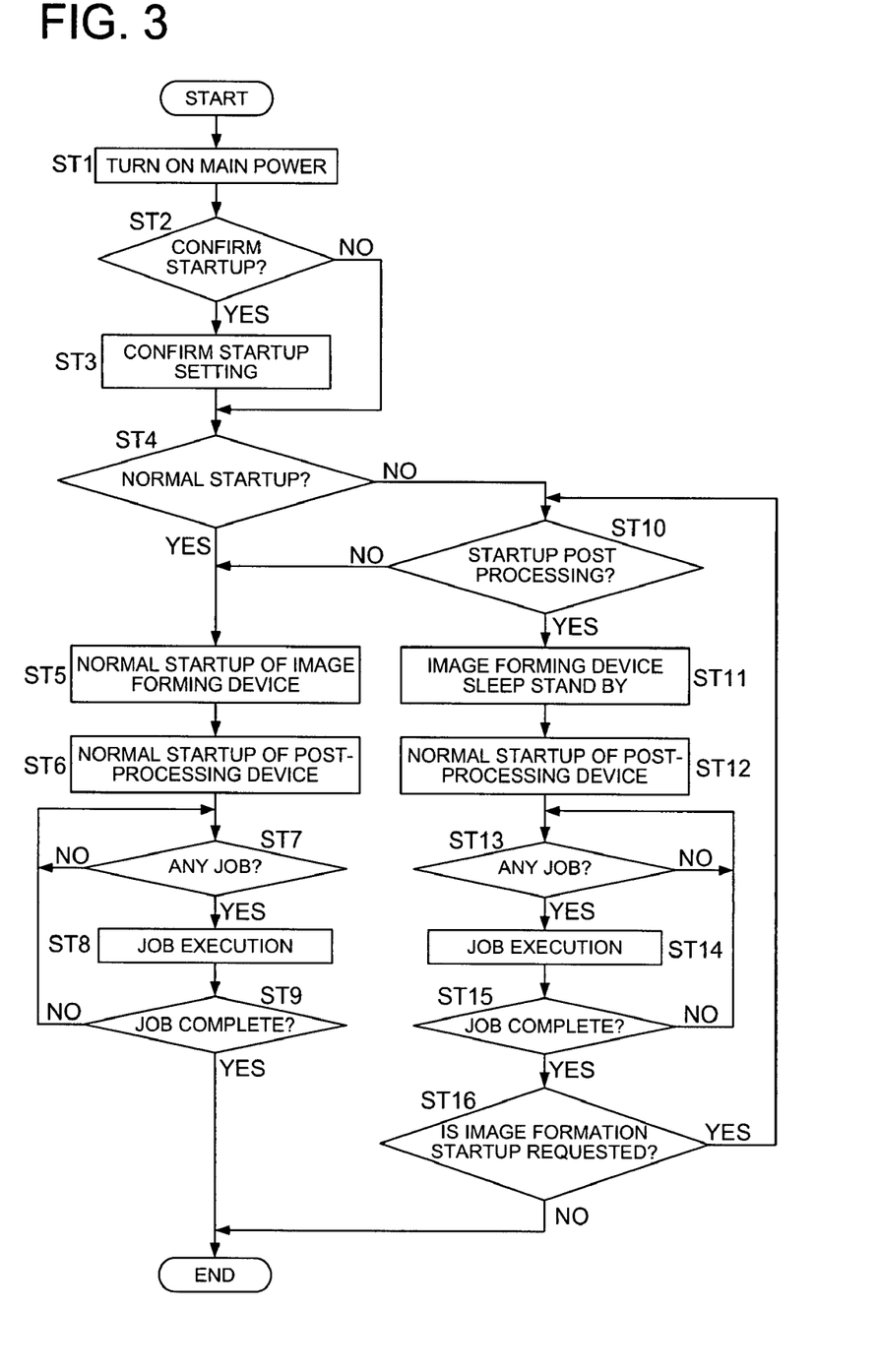
FIG. 3 is a flowchart showing an example of a control procedure of the image forming system in the above embodiment of the invention.

FIG. 1 is a schematic view of an image forming system in the present embodiment of the invention. FIG. 2 is a block diagram showing the circuit structure of the image forming system in the present embodiment. FIG. 3 is a flowchart showing an example of a control procedure of the image forming system in the present embodiment.

A structure of the image forming system in the present embodiment will be described below, referring to FIG. 1.

For simple description, it is assumed that the image forming device 20 in the present embodiment is an electrophotographic copier.

An automatic original document feeder (ADF) is mounted on an image forming device 20, as an image forming unit. A post-processing device, as a post-processing unit, performs post-processing on recording mediums on which an image has been formed, such as inserting (adding) a cover sheet, punching a hole, binding, and folding.

The image forming device 20 is provided with a manual feeding tray to supply transfer sheets P being recording mediums in a relatively small amount at the right side face of a housing 1. The image forming device 20 is arranged so as to be able to eject transfer sheets P on which an image has been formed, from the left side, and convey the sheets P toward the post-processing device 40. Further, the bottom surface of the housing 1 is provided with plural casters to move the image forming device 20.

Transfer sheets P can be briefly categorized, for example, into plain transfer paper sheets P and special transfer paper sheets IP. Plain transfer paper sheets P are called standard paper or plain paper. Special transfer paper sheets IP include thick paper sheets, thin paper sheets, and index paper sheets provided with a protrusion called tab, OHP sheets, and so-called reused sheets which are plain transfer paper sheets on which one side an image has been formed and used to save resources.

A control panel CP is arranged at an upper portion of the front part of the housing 1 to set information on the image forming conditions, post-processing conditions, and the like, thereby making it possible to operate the image forming device 20 in collaboration with the ADF 30, post-processing device, etc.

On the control panel CP, there are provided a liquid crystal display unit or a display unit DP of a touch panel type constructed with a liquid crystal display device with a built-in touch panel, a keyboard KB, a start button (also referred to as a copy button) SK, and the like, and thereby the control panel CP functions as an operation input unit.

By touching designs, such as buttons containing numerals, characters, symbols, or the like displayed on a display section of the touch panel type display unit DP, a user can input selection or setting of information on image forming conditions or post-processing conditions displayed on the display section, and thus the touch panel type display unit DP also functions as an operation input unit.

For example, in the present embodiment, the touch panel type display unit DP enables input of an image forming mode to form an image on transfer paper sheets P, and input on items requiring setting of selection, such as image forming conditions related to the image forming mode.

Further, it is possible to input a post-processing mode to perform post-processing on transfer sheets P, and input on items requiring setting of selection, such as post-processing conditions related to the post-processing mode.

Further, in the present embodiment, the touch panel type display unit DP enables selection of a startup mode for startup of the image forming device 20 or the post-processing device 40, at the time of initial power-on of the image forming system provided with the image forming device 20 and post-processing device 40, and setting of a startup setting confirmation mode to confirm the startup mode having been selected.

Startup modes include a normal startup mode to startup the image forming device 20 and the post-processing device 40 into an operable state and a post-processing startup mode, dedicated to post-processing, for startup of the post-processing device 40 only. More details will be described later.

For example, in order to set a mode for operation of the post-processing device 40 only, the touch panel type display unit DP allows setting of the post-processing dedicated mode, and when the post-processing dedicated mode is set, the post-processing startup mode dedicated to post-processing is executed.

Regarding image forming modes, for example, there are four modes, namely (1) to print out a single-side printed original document sheet on a single side of a sheet (2) to print out single-side printed original document sheets on double sides of a sheet (3) to print out a double-side printed original document sheet on single sides of sheets (4) to print out a double-side printed original document sheet on double sides of a sheet.

As image forming conditions for the image forming mode, there are items, such as setting of: color printing or monochrome printing for printing (also referred to as print or copy) on a transfer sheet to be output, double-sided printing or single-sided printing; the type and size of transfer sheets to be used as transfer sheets; the number of print sheets and number of copies to be output, scaling, and density; and whether to execute the post-processing mode to perform post-processing.

As post-processing conditions for the post-processing mode, there are items, such as setting of categories of post-processing which include cover sheet insertion, stapling, punching, folding, and sorting; setting of page numbers as insertion positions in the cover sheet insertion mode; setting of types of cover sheets for a front cover, back cover, a single cover sheet which can serve as both a front cover and back cover by folding, or cover sheets for intermediate insertion, which are various items related to input of set values to be set as cover sheet insertion conditions.

The keyboard KB, which is an input unit as an operation input unit, is mainly used to input numerals or the like. The start button (also referred to as the copy button) SK is used to start operation of a job, such as copying or the like, by the image forming device 20 and is able to start operation of the ADF 30 and the post-processing device 40 in collaboration. In other words, the start button SK is used to start a series of image forming operations performed by the image forming system including the image forming device 20, the ADF 30, and the post-processing device 40.

In the present embodiment, based on image forming conditions and post-processing conditions for various modes, such as the image forming mode and post-processing mode having been set via the control panel CP, the image forming device 20, for example, can perform image forming operation for a desired number of copies in the image forming mode, and thereafter, the post-processing device 40 can perform a desired post-processing in the post-processing mode. It is possible to start up only the post-processing device 40 into an operable state in the post-processing dedicated mode, and then to perform post-processing in a desired post-processing mode.

Though not shown, in the present embodiment, a power switching unit is provided to supply power to the image forming device 20 and the post-processing device 40 integrated as an image forming system so that the user can operate the power switch from outside the housing 1 of the image forming device 20.

A control unit EC, image forming unit 11, image reading unit 13, sheet feeding-ejection unit 14, and the like are provided inside the housing 1.

The control unit EC is also referred to as a control circuit, and is a control unit to control all the operations of the image forming device 20. The control unit EC is constructed with an electric circuit including a CPU. Based on a control program, control data, etc., stored in the CPU in advance, the control unit EC controls all the units constructing the image forming device 20.

Further, in a case where auxiliary devices, such as the ADF 30 and the post-processing device 40, are connected to the image forming device 20, the control unit EC also functions as a control unit to control driving of the system so that the entire image forming system with the image forming device 20 at the center smoothly operate, in collaboration with these auxiliary devices.

Still further, also in a case where the image forming device 20 is connected with a personal computer or other information equipment via a LAN (local area network) or the like, the control unit EC collaborates with such equipment to be able to control driving of the system smoothly, including storing and receiving/transmitting of information necessary for operation.

The image forming unit 11 is used to form images based on image information on original document sheets and the like. The image forming unit 11 is constructed with, for example, a photoreceptor drum (also called a photoreceptor or image carrier) 5 that rotates, in a direction (for example, the clockwise direction shown by the arrow) having been set in advance and driven by a driving source, such as a motor, a charging unit 6 to uniformly charge the photoreceptor drum 5, an exposure unit (not shown) to irradiate exposure light so as to form an electrostatic latent image on the photoreceptor drum 5, based on the image information (also referred to as image data), a development unit 7 to visualize the electrostatic latent image formed on the photoreceptor drum 5 as a toner image, a transfer-separation unit 8 to transfer the toner image formed on the photoreceptor drum 5 onto a transfer sheet P or the like, a cleaning unit 9 to wipe off paper powder remaining on the photoreceptor drum 5 after the toner image is transferred to the transfer sheet P, a fixing unit 10 to melt and fix the transferred toner image on the transfer sheet P, and the like.

Although in the present embodiment, the image forming unit 11 has been described to have a single photoreceptor drum 5 for a simple description, it is of course possible to use an image forming unit of a tandem type, for example, which uses plural photoreceptors 5 described above, for example, to form toner images of Y (yellow), M (magenta), C (cyan), K (black), or the like on a transfer belt being an intermediate transfer body and transfer the images onto a transfer sheet at a time.

Some kinds of transfer paper sheets tend to be curly, and depending on the state of the curl, a sheet does not easily separate when it should separate from the photoreceptor drum, and may cause a problem that the sheet winds around the photoreceptor drum 5. In order to prevent this, in the present embodiment, the image forming device 20 is provided with a separation claw unit (separation unit) 15 having a claw member that can contact with and separate from the photoreceptor 5, as a unit to aid the operation of the transfer-separation unit 8 that separates a transfer paper sheet from the photoreceptor drum 5.

The image reading unit 13 is constructed with a reading optical system having a light source LT, mirror group MR, imaging lens LZ, and the like, and with a reading device ES having an electric circuit including a CCD (a solid state image sensing device) and the like.

In a case where the image forming device 20 is a copier, the reading device ES reads image information of an original document sheet loaded on a platen glass (not shown) located on the bottom side of the automatic original document feeding device 30 and arranged on the top of the housing 1, or reads image information of an original document sheet conveyed to a reading position by the automatic original document feeding device 30, converts the image information into digital image data, and stores the image data in a storage unit provided on the control unit EC, by compressing the data for example.

Further, in order to read an original document sheet conveyed by the ADF 30 with the image reading unit 13, the original document sheet conveyed to a reading position is irradiated with the light source LT, light reflected from the original document sheet and coming through the mirror group MR is imaged on the CCD surface of the reading device ES by the imaging lens LZ, and image information that is output by the CCD is stored in the storage unit as image data.

The sheet feeding-ejection unit 14 is constructed with a sheet feeding cassette 12, a motor, not shown, as a driving source, plural rollers, and a sheet feeding-and-ejection conveying unit arranged with a guide member to guide the conveying direction, a lever to switch the conveying direction, and the like.

The sheet feeding cassette 12 is constructed with, for example, a cassette 12a to store special transfer paper sheets IP and a cassette 12b to store transfer paper sheets called plain paper sheets.

The sheet feeding and ejection conveying unit is constructed with, for example, a straight conveying unit and a circulative conveying unit, wherein the straight conveying unit has a straight conveying path that enables image forming on a single side of a transfer paper sheet conveyed from the sheet feeding cassette 12 by the image forming unit 11 and ejection of the sheet.

The circulative conveying unit is provided with a circulative conveying path to reverse the conveying direction of a transfer sheet, on which single side (also referred to as the front side) an image has been formed, in the course that the sheet is conveyed to the ejection direction, and also reverse the front and back side so that an image can be formed on the other side (also referred to as the back side), thus enabling image forming on both the front and back sides of the transfer sheet.

As to whether which of the straight conveying path and circulative conveying path is to be operated is controlled such that the control unit EC judges the printing side information (also referred to as the print mode), such as single-sided printing or double sided printing, the information being image forming conditions having been set by input via the control panel CP, which is an operation input unit.

In order to convey a transfer sheet, a circulative conveying control unit operates the sheet feeding-and-ejection conveying unit, upon instruction by the control unit EC. For example, in the case of the single-sided mode which forms an image on a single side, the special transfer paper sheet IP or plain paper sheet P is selected and set in advance, and thereafter, a motor being the driving source is rotated. Thereby, plural roller groups and the like are rotationally driven, thus the special transfer paper sheet IP or the plain paper sheet P selected in advance is fed and conveyed from the sheet feeding cassette 12 toward the photoreceptor drum 5 at a proper timing, then, an image is formed, based on an original document sheet, and then the sheet is conveyed to be ejected.

Further, in the case of double-sided mode which forms an image on both sides, in other words, performs so-called double-sided printing (also referred to as front-and-back double-sided printing), the circulative conveying control unit operates the sheet feeding-and-ejection conveying unit and the like, upon instruction by the control unit EC. In the course that a transfer sheet, on which single side an image has been formed by the image forming unit 11, is conveyed in the sheet ejection direction (arrow X direction), for example, at the time when the leading edge of the transfer paper sheet has passed a revering roller 17, rotation of the reversing roller 17 is stopped, and the rotation direction of the reversing roller 17 is switched so that the transfer sheet is conveyed in the direction back to the image forming unit 11.

Simultaneously, the reversing member 16 is rotated clockwise so as to change the moving direction of the transfer sheet having been conveyed in the direction toward the image forming unit 11, to the path (also referred to as a circulative conveying path) shown by arrow X2.

The transfer sheet is conveyed in the circulative conveying path, according to the possible circulative number of sheets which has been set in advance, and thereby, the transfer paper sheet is temporarily made to be in a standby state. Then, the transfer paper sheet is conveyed at a proper timing from the arrow direction X2 to the arrow direction X1 so as to perform image forming by the image forming unit 11 again, and the transfer sheet, on which both sides an image has been formed, is ejected in direction X so as to be conveyed to the post-processing device 40.

In general, a conveying path for a transfer sheet is in most cases provided with a guide member to convey the transfer sheet properly. However, in the present embodiment, showing and description related to a guide member are omitted for simple description.

The automatic original document feeding device (ADF) will be briefly described below.

Regarding the ADF 30, the entire conveying device is covered by an ADF housing 31, and an original document loading table 32 and a sheet ejection section 33 are provided outside the ADF housing 31.

For example, plural original document sheets are placed on the original document sheet loading table 32 so that the original document surface (front surface) of the first page is placed uppermost. A placed original document sheet WP is conveyed by a document conveyance device structured by a plurality of rollers to a reading position and read by the reading device ES. Then, the placed original document sheet WP is ejected to the sheet ejection section 33.

The document conveyance device is arranged to work with a control device EC in the image forming device 20 under the control of a drive-control circuit (not shown).

The configuration of the post-processing device 40 will be briefly described below.

A post-processing device 40 is covered by a post-processing device housing 41. On the right side surface section (the image forming device 20 side) of the post-processing device housing 41, an insertion-entrance 43 for receiving the transfer paper sheet, onto which an image is formed, and ejected from the image forming device 20 is provided, and in the left side surface section of the post-processing device housing 41, a paper sheet feeding section n4 for supplying the cover sheet K, which has not been fed yet, an ejected paper sheet tray (a stacking paper sheet section) n9 for loading, for example, a bundle of bound transfer paper sheets and an ejected paper sheet receiving tray (a loading section) n10 for receiving the folded bound transfer paper sheets are provided. A plurality of rollers 42 for moving the post-processing device 40 is provided on the bottom surface section of the housing 41.

In the present embodiment, an operation input unit dedicated to the post-pressing, which allows selection and setting of post-processing conditions, is provided on the exterior of the housing 41 so that when the mode dedicated to the post-processing is selected and set, only the post-processing device 40 is operated to perform in the required post-processing mode.

Inside the housing 41 provided are a control unit, drive control circuit and motor, which are parts, not shown, of the post-processing device, and collaborate with the control device EC of the image forming device 20.

Further, a shift process section (also referred to as a punching device) n5, an intermediate stacker (a stacking section) n6, a stapler n7 (a stapling device), a folding device n8 and further, conveyance paths R5, R6, R7, R8, R9, R10, R11, R12, R13 and R14 are provided.

In the present embodiment, the operation input device dedicated to the post-processing device is provided so that the mode dedicated to the post-processing operation is easily executed. However, the control panel CP and the control circuit EC of the image forming device 20 may be commonly utilized without providing an operation input device on the post-processing device.

The conveyance paths R5-R11 construct a post-processing conveyance device having a plurality of conveyance roller pairs, which are mainly configured by driving rollers and driven rollers. For example, a pickup roller 44 for picking up the cover sheet K, a sheet by a sheet, and a pre-feed stop position Q3 configured by a pair of conveyance rollers, which is capable of temporarily stopping the cover sheet K and making it into a standby state.

Further, a conveyance path change device configured by a rotatable guide LB for changing the conveyance path from the conveyance path R5 to the conveyance path R8 or the conveyance path R9, or from the conveyance path R7 to the conveyance path R8 or the conveyance path R9 is provided.

Here, the coversheet K to be used for a cover and the like is generally structured by a sheet formed by a material of paper and resin film. However, in a special case, for example, a sheet of wood, leather or metal film is also used.

Here, the operation of the prost-processing device 40 will be briefly described.

In order to simplify the explanation, the cover sheet is assumed to be inputted to be utilized as a cover of a booklet and to have been known that the cover sheet K is inputted to be used as a cover sheet in advance. These premises are assumed to have been set in advance by the operation input unit 200 of the image information forming device 20.

When inserting the cover sheet K, the post-processing conveyance device is operated via the drive control circuit of the post-processing device 40, which operates together with the image forming device 20 so that the pickup roller 44 pickups the cover sheet K placed on the paper sheet feeding section n4, a sheet by a sheet, conveys them along the conveyance path R6 and stops them at the position where the front edge of the cover sheet K contacts with the pre-feed stop position Q3.

Based on the information from the image forming device 20, the post-processing conveyance device is turned on again in accordance with the timing of the ejection of the transfer paper sheet, onto which an image has been formed, from the image information forming device 20. Then, the cover sheet K, which is in the standby state, is sent out (conveyed again) and stops at the pre-feed stop position Q3, is conveyed out again. The cover sheet K proceeds along the conveyance path R7.

When stapling (binding), punching (holing) or folding is not conducted, since the guide LB is pausing at the position shown in FIG. 1, the cover sheet K is conveyed from the conveyance path R7 to the conveyance path R13 through the conveyance path R8 and ejected to the ejected paper sheet tray n9. The transfer paper sheets, onto which an image has been formed, subsequently enter the conveyance path R5 from the insertion-entrance 43. Then the transfer paper sheets are continuously conveyed to the conveyance paths R8 and R13, and ejected to the ejected paper sheet tray n9. Finally a stack of the transfer paper sheets having cover sheet thereon is formed.

When conducting the stapling, the punching or the folding, since the guide LB is pausing after having rotated counterclockwise from the position shown in the FIG. 1, the cover sheet K is fed from the pre-feed stop position Q3 and further conveyed along the conveyance path R7 and the conveyance path R9. Then the cover sheet K is ejected to the intermediate stacker n6.

The same as described above, when the transfer paper sheet, onto which an image has been formed, proceeds to the conveyance path R5 form the insertion-entrance 43, since the guide LB is pausing after having rotated counterclockwise from the position shown in the FIG. 1, the transfer paper sheet cannot be conveyed to the conveyance path R8 and the direction is changed to the conveyance path R9. Then the transfer paper sheet is conveyed along the conveyance path R9 and ejected to the intermediate stacker n6. At this moment, in the intermediate stacker n6, the edges of the cover sheet K previously ejected and succeeding transfer paper sheets are aligned and a stack of the transfer paper sheets having a cover sheet is formed.

When conducting stapling, after having bound the cover sheet K and the transfer paper sheet by using the stapler n7, the stapled cover sheet K and the transfer paper sheets are conveyed from the conveyance path R10 to the conveyance path R13 and ejected to the ejected paper sheet tray n9. Finally, the stapled cover sheet K and the transfer paper sheets are formed into a bundle of transfer paper sheet having a cove sheet.

When stapling, punching or folding, for example, the punching device n5 holes the transfer paper sheet and the stapler n7 bundles the cover sheet K and the transfer paper sheet. After that the bundle of transfer paper sheet having a cove sheet is further conveyed along the transfer path R11. A folding device n8 folds the cover sheet K together with the transfer paper sheets and the cover sheet K together with the transfer paper sheets is conveyed to the conveyance path R14 from the conveyance path R12. The cover sheet K together with the transfer paper sheets is ejected to the ejected transfer paper sheet tray n10. This is the process for bundling and folding a stack of folded transfer paper sheet with a cover sheet.

When performing sorting, the cover sheet K stops at the shift process section n5 provided on the middle of the conveyance path R8 and the subsequent transfer paper sheets are loaded thereon at this position. After that, since the cover sheet K, which is together with the transfer paper sheets, is arranged to move in the up and down direction, which is perpendicular to the conveyance direction, with a posture, which is parallel to the sheet surface, and the ejected paper sheet trays n9 are provided at plural positions (not shown), cover sheets K are arranged to be conveyed to respective ejected paper sheet trays n9 based on the collaboration between the shift process section n5 and the ejected paper sheet tray n9.

When simply folding the cover sheet K and the transfer paper sheets, the cover sheet K and the transfer paper sheet, which have been ejected to the intermediate stacker n6 and stacked thereon, are arranged to be aligned in the intermediate stacker n6 and to be conveyed to the folding device n8 along the conveyance path R11. The cover sheet K and the transfer paper sheets are folded by the folding device n8, conveyed from the conveyance path R12 and ejected to an ejected paper sheet tray n10. The cover sheet K and the transfer paper sheet may be arranged to be ejected from the folding device n8 to the ejected paper sheet tray n9.

The detailed description of the structure for the punching device 5n and stapling device n7 will be omitted in the present embodiment. However, the punching device 5n and stapling device n7 provided in the post-processing device 40 are arranged to change the positions and intervals to staple and punch the transfer paper sheets by operating the actuator configuring the punching device 5n and stapling device n7 according to the predetermined operation.

The detailed description will be omitted here. However, in the present embodiment, in order for the user to make his or her own unique booklet, the position and the distance of the stapling, punching and the like are arranged to be freely set by operating the control panel CP by applying this adjustment program.

In the present embodiment, particularly, the image processing system is arranged to conduct the post processing by starting up only the post-processing device 40 as the mode dedicated to the post-processing.

Particularly, when conducting the post-processing in the mode dedicated to the post-processing, placing the recording medium, to which the post-processing is applied, onto the paper sheet feeding section n4 of the post-processing device 40 instead of cover sheet K, selecting and setting up the mode dedicated to the post-processing after turning on the power switch, and inputting the post-processing mode and required process conditions to execute the post-processing mode and the required process conditions, allow the post-processing device to be getting into an operable state and the required post-processing can be applied to the recording medium under the required post-processing mode and the required post-processing condition.

When the power switch has been turned on and the post-processing device has been brought into an operable status, regardless whether or not the mode dedicated to the post-processing has been set, placing a recording medium, to which the post-processing is applied, onto the paper sheet feeding section n4 of the post-processing device 40, and operating an execution button (not shown) of the operation input device after inputting the post-processing mode and required process conditions, allow the required post-processing, which has been set up, to be executed.

Next, the circuit configuration of the image forming system of the embodiment of the present invention will be described by using FIG. 2 hereinafter. The image forming system of the present embodiment includes an image forming device 100, an automatic original document feeding device 30 and the post-processing device 40.

FIG. 2 shows a configuration including the various units and circuits of the image forming device 20. Numeral 110 denotes a CPU for controlling the total image forming device. The CPU 110 includes programs having various modes for controlling the image forming device 20 and necessary data needed for executing programs.

The CPU 110 is connected to an information control circuit 120, an image processing circuit 140, a drive control circuit 150 and a power supply circuit 400. These circuits and the CPU 110 configure a control unit EC illustrated in FIG. 1. The control unit EC is arranged to control the total image forming system centering on the image forming device 20 by collaborating with the automatic original document feeding device 30 and the post-processing device 40, which are described later.

The information control circuit 120 is connected with an external information equipment 500 via an interface (I/F) 130 to store information of characters and images, and setting information such as the density and the magnification necessary for image formation as job information into a memory unit 160 in a job unit, which will be a print job unit under the command of the CPU 110. The setting information stored in the memory unit 160 is arranged to be outputted to the image processing circuit 140, the drive control circuit 150 or a display unit 300.

Further, even though the details will be described later, the information control circuit 120 also has functions for automatically and appropriately transmitting data associated with the job information (also, referred to as job data), for example, the input and output of instruction information related to the detailed control needed to operate various circuits and units including the image processing circuit 140 and the drive control circuit 150, and various information items related to the kinds of transfer paper sheet and the image, forming mode inputted from an operation input unit 200 to respective circuits of the image forming device and various units not to have operation troubles of the image forming device.

Further, the information control circuit 120 also has a function for judging the various information outputted from various circuit and sensors provided in the various units to assist the CPU 100 so as to issue appropriate instructions.

With respect to the external information equipment 500, they will be mainly computers and internet servers. However, in a special case, they may be another image forming device, a digital camera or an information equipment, such as a measurement equipment, which is capable of outputting the measured information on a local area network (LAN).

The information control circuit 120 determines whether or not a normal mode for subsequently performing the post-processing in the post-processing device 40 after the image forming operation of the image forming device 20 is selected by the operation input unit 200. When determined that the normal mode has been selected, the information control circuit 120 inputs that the normal mode has been selected to the CPU 110 and the CPU 110 is arranged to execute the normal mode program, which has been set in advance, via the drive control circuit 150 so that the post-process is conducted by the post-processing device 40 following the image forming operation of the image forming device 20 as the normal mode.

When determined that the post-processing dedicated mode has been selected, the program of the post-processing dedicated mode, which has been set in advance, is arranged to be executed so that only the prost-processing device executes the necessary post-processing operation.

Particularly, in the present embodiment, when determining whether or not the normal mode has been set after the power switch has been turned on, and if it is determined that the normal mode has been set, an initial setting mode for starting up the image forming device 20 and the post-processing device 40 into normal state for operation is arranged to be executed. When a post-processing dedicated mode has been set, the post-processing startup the mode dedicated to the post-processing, is arranged to be executed.

Namely, an initial setup mode is a mode; to start, for example, warm-up of the fixing device provided in the image forming unit 11, which is the image forming section of the image forming device 20; to startup the image forming device 20 into the normal state for operation, in which the image forming device 20 can execute image forming operation; also to startup the post-processing device 40 into the normal state for operation; and further to conduct initial setting of necessary items while the image forming device 20 and the post-processing device 40 exchange information, so that the image forming device 20 and post-processing device 40 can operate in collaboration with each other.

A post-processing startup mode dedicated to the post-processing is, in the present embodiment, a mode to perform startup operation in the following manner so that only the post-processing device operates to execute post-processing. The CPU 110 starts up only a part of the control circuit EC of the image forming device 20, and executes a sleep mode, which does not operate unnecessary warm up operation of the fixing device. The CUP 40a of the post-processing device 40 conducts a startup operation so that the post-processing device 40 quickly turns into the operable state.

The startup mode for starting up the post-processing device 40 to turn it into the operable state basically conducts the same starting up operation in both the initial setting mode and the post-processing startup mode dedicated to the post processing. However, the difference is as following. In the initial setting mode, the starting up operation is arranged to start up the post-processing device 40 and, also, to execute the information exchange, which has been described above in order to conduct the collaboration with the image forming device 20. In the post-processing startup mode dedicated to the post processing, since it is not necessary to conduct the collaboration with the image forming device 20, the post-processing startup mode dedicated to the post processing does not execute such information exchange, thus shortening the time necessary for the startup operation.

The interface (I/F) 130 is an information receiving and transmitting device, which is configured to be connectable with external information equipment 500, such as the above mentioned computer, another image forming device, an internet server, or the like via various networks.

Particularly, in the present embodiment, the image forming system is not only configured by the image forming device 20 and the post-processing device 40 but also is arranged to be configured so as to execute various controls, such as, for example, the control of the startup mode and the like to the image forming device 20 and the post-processing device 40 from the personal computer, which is external information equipment 500, via network, such as the LAN and the like described above.

The operation input unit 200 is configured by a touch panel type liquid crystal device DP, which is constructed with a keyboard DB, start button SK and the like on the control panel CP of the image forming device 20, and serves as both an input device and output device, and others.

For example, when pressing a start button SK, the conveyance of the original document placed on the ADF 30 starts, the copy operation starts and an image forming mode is executed in collaboration with the post-processing device 40 if the post-processing mode is set.

An operation of the keyboard KB can input the setting information, such as the number of output of transfer paper sheet, the kinds of the transfer paper sheet (for example, an index sheet, a thick paper sheet, a plain paper sheet, a thin paper sheet, a recycle paper sheet, an OHP sheet, a reused paper sheet and the like), a magnification, such as enlargement/reduction and the density of the output image. Various operation modes of the image forming device 20 are arranged to be set up by using the liquid crystal display device DP.

Particularly, in the present embodiment, when conducting the post-processing by operating only the post-processing device 40 after having turning on the power switch, the post-processing startup mode dedicated to the post-processing starts up the post-processing device 40 into the operable statue. A desired post-processing is arranged to be performed on the recording medium under desired post-processing conditions in a desired post-processing mode.

The image processing circuit 140 is a circuit, which, for example, converts the read image information, which has been read by the image reading unit 13, into a digital form, compresses and memorizes it into the memory unit 160, expands the image data stored in the memory unit 160 when the image forming unit 11 forms the image, and converts them to the data or signals suitable for the image forming method of the image forming unit 11.

The drive control circuit 150 is a circuit for operating the image forming unit 11, the image reading unit 13, a sheet feeding-ejection unit 14, the ADF 30 and the post-processing device 40 under the instruction of the CPU 110 according to the operation mode, which has been set in advance, with appropriate timing, and conducting the image forming operation.

The memory unit 160 is arranged to memorize the image data necessary for forming image, the job information and the job data configured by various setting conditions for controlling the image forming device 20, and the program information of various image forming modes executed by the image forming device 20.

Likewise, the memory unit 160 is arranged to memorize various post-processing data needed for performing the post-processing, the job information and the job data configured by various setting conditions for controlling the post-processing device and the information of the program of various post-processing modes, which have been set in advance.

In the present embodiment, the memory unit 160 keeps memory of the first mode referred to as the normal mode, which allows the image forming device 20 and the post-processing device 40 to collaborate with each other so as to apply the post-processing to the recording medium, onto which an image has been formed, and the second mode, referred to as the post-processing dedicated mode, which operates only the post-processing with the post-processing unit.

With respect to startup modes, the initial setting mode is set corresponding to the first mode, and the post-processing startup mode dedicated to the post-processing, which starts up only the post-processing device into an operable state, is set corresponding to the second mode.

For example, the normal startup mode is executed if the first mode has been set. The normal startup mode starts up the control circuit EC of the image forming device 20, warms up the fixing device, and also starts up the post-processing device 40 in collaboration with the post-processing device 40 through information exchange and information transfer of initial setting information. A post-processing startup mode dedicated to the post processing is executed if the second mode has been set. The post-processing startup mode dedicated to the post-processing operates only the post-processing device. The initial setting mode as the normal startup mode and the post-processing startup mode dedicated to the post-processing are memorized in the memory section 160.

Further, in the present embodiment, a startup setting confirmation mode for setting whether or not to confirm the startup mode set in advance, after having tuned on the power switch with operating the power switch can be memorized. The detailed description will be omitted here. However, the operation input unit 200 is arranged to set the startup setting confirmation mode.

The JOB information and the JOB data in the present embodiment of the invention will be defined as following.

JOB information denotes information of respective jobs, when the image forming device 20 is a copier, for example, to set the original document based on the image information of the original document, selection of a single sided mode or a dual sided mode, selection of a paper sheet feeding cassette, selection of the number of copies, selection of a print density and the like. In other words, the job information means a series of image data determined by conducting output settings and instructing copy start. The print data group corresponding to one print instruction (which will be called 1 (one) print unit) as described above is called 1 (one) JOB.

Similarly, when the image forming device is, for example, a printer, a series of print data group transmitted from the external information equipment 500 is called JOB information and the print data group corresponding to one print instruction is called 1 (one) JOB. And to handle JOB information and Job data per 1 (one) JOB is called 1 (one) JOB unit.

JOB data denotes control data related to, for example, the setting of the conveyance speed corresponding to the transfer paper sheet or related to the detailed control item needed to execute an image forming operation.

Consequently, the memory unit 160 stores the JOB information and JOB data per a JOB, namely, 1 (one) JOB unit (it may be simply called a JOB unit).

The image forming unit 11 includes a photoreceptor drum 5, a charging unit 6, a developing unit 7, a transfer separation unit 8, a cleaning unit 9, a fixing unit 10 and a separation claw unit 15, which are controlled and driven by a drive control circuit 150, as shown in FIG. 1.

Accordingly, the image forming unit 11 is arranged to be controlled by the image data read by the image reading unit 13, the JOB information and the JOB data memorized in the memory unit 160. Then the image forming unit 11 forms an image on the photoreceptor drum 5, transfers and records the image onto a plain paper P or a reused paper IP.

As shown in FIG. 1, the image reading unit 13 is configured by an optical reading system and a reading device ES. The reading device ES reads out the image information of the original document sheet, which has been conveyed to the read position by the drive and control circuit 150. The read image information is converted into digital image data by the image processing circuit 140, for example, compressed and memorized into the memory unit 160.

The sheet feeding-ejection unit 14 is configured by a sheet feeding cassette 12 and a sheet feeding-ejection conveyance unit, a circulative conveyance control unit and the possible circulative number setting unit as described above.

As shown in FIG. 1, the automatic original document feeding device (ADF) 30 is a device for automatically conveying the original document placed on the original document sheet loading table 32 to the reading position one piece by one piece by an original document sheet conveyance device. The automatic original document feeding device (ADF) 30 operates under the collaboration with the drive control circuit 150 based on the instruction of the CPU 110 of the image forming device 20.

The post-processing device 40 is arranged to operate a post-processing device 40c to conduct post-processing, such as, punching, binding (stapling) of a recording material, sorting, a post-processing for inserting a cover sheet and the like via a drive control circuit 40b based on the post-processing conditions, which have been set by the operation input device (not shown) dedicated to the post-processing under the instruction of a CPU 40a as a control device of the post-processing device 40.

When executing an image forming mode that conducts post-processing under the collaboration with the image forming device 20, the CPU 110 of the image forming device 20 operates and the CPU 40a of the post processing device 40 collaborate with each other to operate the post-processing device via the drive control circuit 40b.

A power supply circuit 400 is arranged to supply appropriate power to the total image forming system from the power supply when the power switch (not shown) is turned on by the user and the power is cut when the power switch is turned off.

Even when the power switch has been turned on, if the image forming device is in a power save mode, for example, the program for the CPU 110 is arranged to supply only the power needed to temporally keep the contents of the memory and cut off the power to other units such as the heater of the fixing unit under the instruction of the CPU 110.

Next, the control procedure of the image forming system of present embodiment will be described by referring to FIG. 3. When necessary, FIGS. 1 and 2 will be referred for the explanation. As a premise, in order to simplify the explanation, in the present embodiment, the image forming device is assumed to be configured as a copier and the image forming device is configured as a copier equipped with a post-processing device. The image forming device is arranged so that the power is inputted (supplied) or cut off across the total image forming system by operating the power switch of the copier. Further, in the image forming device of present embodiment, the image forming device is arranged so that the user can operate and use only the post-processing device, as necessary.

(ST 1)

ST1 is a step for turning on the main power. Namely, when the power switch provided on the copier as a main power switch is turned on, the power is supplied across the total image forming system. However, in the present embodiment, when the power switch is turned on, the power is supplied to a necessary but minimum control units for the control of the image forming device, for example, the control circuit EC including the CPU 110, which is a control unit of the copier, and CPU 40a, which is a part of control circuit of the post-processing circuit.

The CPU 110 operates the information control circuit 120. When the power is turned on, the program proceeds to ST 2 in order to check how the startup setting confirmation mode for starting up the copier and the post-processing device to turn into an operable status has been set.

An operable status is a status in which a series of image forming operations to form and fix an image onto a recoding medium is ready to be executed, for example, quickly when the image information has been inputted as a predetermined job for forming an image onto the recording medium if the image forming system is a copier. Similarly, in the post-processing device, an operable status is a status, in which a post-processing based on the post-processing information is ready to be applied to the recording medium, quickly when the post-processing information, such as, punching, stapling, folding and sorting as a predetermined job has been inputted.

(ST2)

ST2 is a step for determining whether or not to confirm the startup setting. The information control circuit 120 confirms the startup setting confirmation mode. When having determined that "the startup setting confirmation is executed" has been set, the program proceeds to ST3. When "the startup setting confirmation is executed" has not been set, namely, the startup setting confirmation is not conducted, the program proceeds ST 4.

With respect to the setting of the startup setting confirmation mode, detailed description of the setting method will be omitted here. However, the present embodiment is arranged to be able to select and set as to whether or not "the startup setting confirmation is executed" in advance on the touch panel screen of the display unit DP.

(ST3)

ST 3 is a step for executing the confirmation of startup setting. For example, when confirmed that a required startup mode is displayed on the touch panel screen of the display unit DP and this startup mode has been set, the program proceeds to ST 4 by touching the confirmation button (not shown) on the screen.

As the startup mode for startup setting, as describe above, there are two modes, which are an initial setting mode and a post-processing startup mode. The initial setting mode as a normal startup mode is a mode for operating the image forming device and the post-processing device under the collaboration of the image forming device and the post-processing device. The post-processing startup mode is a mode dedicated to the post-processing for operating only the post-processing device. When a desired startup mode has not been set yet, for example, it is possible to touch a correct button (not shown) displayed on the screen of the touch panel display unit DP to display the startup modes and to touch the button showing the desired startup mode to change the setting.

After having set the desired startup mode, the program proceeds to ST 4 by touching the confirmation button displayed on the screen. The method for confirming and correcting the startup mode is not limited to the operation method described in the present embodiment.

(ST 4)

ST 4 is a step for determining whether or not the mode is a normal startup mode. When the normal startup mode has been set as a startup mode, the program proceeds to ST 5. When the post-processing startup mode dedicated to the post-processing has been set, the program proceeds to ST 10.

(ST 5)

ST 5 is a step to start up the image forming device into the normal operable state. When the power switch is turned on, the initial setting mode as a normal startup mode is executed. The control circuit EC of the image forming device 20 starts up and the warm up operation of the fixing device of the image forming unit 11 starts. Then the program proceeds to ST 6.

When executing a image-forming-device startup mode as a mode requesting for startup of the image forming device in the step ST 5, since the sleep mode, which does not operate unnecessary warm up operation of the fixing device and the like, has been executed in the post-processing dedicated mode, it may be possible to execute only the operations of the unit, which have not been in an operable status. However, since there is a possibility that an erroneous startup operation occurs in the setting process of necessary items, it is preferable to execute the initial setting mode as the normal startup mode.

(ST 6)

ST 6 is a step for starting up the post-processing device to get into an operable status. When the initial setting mode of the image forming device 20 has been executed, the information exchange of the initial setting information and the like are conducted under the collaboration with the post-processing device 40 and the post-processing device 40 is controlled to be in an operable status. Then the program proceeds to step ST 7.

When the post-processing startup mode dedicated to the post-processing has been already executed, only the information exchange and the information transfer of the initial setting information and the like may be conducted so that the post-processing can be operated under the collaboration with the image forming device 20.

(ST 7)

ST 7 is a step for determining whether or not there is a job. Namely, when the image forming device 20 and the processing unit 40 have entered an operable status under the collaboration with each other, the CPU 110 operates the information control circuit 120 to determine whether or not a job information (JOB) has been inputted to the memory unit 160. When JOB information has been inputted to the memory unit 160, the program proceeds to ST 8. When JOB information has not been inputted to the memory unit 160, the process of ST 7 enters a waiting state, which waits for input of a JOB information while the process of ST 7 is repeatedly executed.

(ST 8)

ST 8 is a step for executing a job. The CPU 110 reads out the job (JOB) information, which has been inputted in the memory unit 160. Then the CPU 110 executes image forming operations and post-processing operations under the collaboration between the image forming device 20 and the post-processing device 40 based on the read JOB information.

For example, the CPU 110 operates the image processing circuit 140 and the drive control circuit 150 to form an image onto the recording medium P based on the JOB information. When the post-processing is requested in the setting, the post-processing device 40 applies the requested post-processing to the recording medium P and the recording medium P will be ejected.

In the present embodiment, even when the post-processing has not been set, the image forming system is arranged to convey the recording medium P, onto which an image has been formed in the image forming device 20, through the post-processing device 40 and eject it onto the ejected paper sheet tray n9 of the post-processing device 40.

(ST 9)

ST 9 is a step for determining whether or not to terminate a job. Namely, step ST 9 is a step for determining whether to continuously execute or terminate the image forming operations and the post-processing operations by the image forming device 20 and the post-processing device 40 when the image forming operations and the post-processing operations based on a series of JOB information have been completed.

The detailed description will be omitted here. However, for example, if termination of operation has not been input and if the power switch unit for switching off the power supply has not been operated, the program proceeds to ST 7, and enters a waiting status waiting for the input of the JOB information.

For example, when the information control circuit 120 has detected that the power switch unit is operated to cut off the power supply in order to terminate the image forming operations, the control circuit EC will cut off the power supply of the power circuit 400 and finish the total operations (END) after the CPU 110 executes the terminate operations, such as initialization of various units in the image forming system.

(ST 10)

ST 10 is a step for determining whether or not the post-processing startup mode dedicated to post-processing has been set. When the post-processing startup mode dedicated to post-processing has been set as a startup mode, the program proceeds to ST 11. When a mode different from the post-processing startup mode dedicated to post-processing has been set, the program proceeds to ST 5.

A mode different from the post-processing startup mode dedicated to post-processing denotes a mode for requesting the startup of the image forming device by starting up the image forming device 20 to conduct image formation after having executed the post-process operation by operating only the post-processing device 40.

In the present embodiment, when a image-forming-device start button (not shown) provided on the post-processing device 40 is operated by the user, the mode for requesting the startup of the image forming device will be executed. Concretely, the image-forming-device startup mode is executed to start up the image forming device 20 to turn it into an operable state, after completion of post-processing operation.

With respect to the image-forming-device startup mode, the initial setting mode as a normal startup mode of the image forming device 20 is arranged to be executed in the step ST5.

The image forming system may be arranged such that the operation input unit of the post-processing device 40 or the operation input unit 200 of the image forming device 20 is used to set the startup requesting mode of the image forming device and to execute the operation other than the image-forming-device startup button.

(ST 11)

ST 11 is a step for turning the image forming device 20 into a sleep status. The sleep mode is executed against the image forming device 20 and the program proceeds to step S12.

The sleep mode is a mode which makes functions standby that are enough to turn the information control circuit 120 and the CPU 100 of the control circuit EC get into an operable status in order to respond input of the information, such as the mode for requesting the startup of image forming device even though, for example, the post-processing is under operation.

Namely, since the image forming operation is not conducted, it is not necessary to startup the image forming device 20. Thus, a sleep mode is executed on the image forming device 20. The initial setting mode for starting up the image forming device 20 into a normal state is not executed. The warm up of the fixing device of the image forming device 20, nor the information exchange and information transmission of the initial setting with the post-processing device 40 is not conducted. Those processes described above shorten the startup time necessary for the post-processing device 40 to become in an operable state and prevent the waste of useless power energy.

(ST 12)

ST 12 is a step for starting up the post-processing device into a normal status. The CPU 40a, which is a control unit of the post-processing device 40, executes the post-processing mode dedicated to the post-processing so that the drive control circuit 40b of the prost-processing device 40 can execute a post-processing operation quickly and also the information can be transmitted to the CPU 110 of the image forming device 20 even though it is not necessary to collaborate with the image forming device 20. Then, the program proceeds to ST 13.

(ST 13)

ST 13 is a step for determining whether or not there is a job. When the post-processing device 40 has entered an operable status, the CPU 40a of the post-processing device 40 determines whether or not the post-processing information of the post-processing mode, post-processing condition and the like has been set by the operation input unit (not shown) of the post-processing device 40. The detecting unit (not shown) provided on the paper sheet feeding section n4 determines whether or not the recording medium placing information for indicating that the recording medium is placed on the paper sheet feeding section n4 has been outputted. When post-processing information has been set and the recording medium placing information has been outputted, the program proceeds to ST 14. When the JOB information of the post-processing information or the recording medium placing information has not been inputted, the program proceeds to ST 13 and the program enters the status waiting for the input of the JOB information.

(ST 14)

ST 14 is a step for executing a job (JOB). When the CPU 40a of the post-processing device 40 has applied the post-processing operation to the recording medium based on the post-processing information and ejected the recording medium, the program proceeds to ST 15.

(ST 15)

ST 15 is a step for determining whether or not to terminate job (JOB). Namely, ST 15 is a step for determining whether to continuously execute or terminate the post-processing when a series of the post-processing operations based on the JOB information has been completed.

For example, when the post-processing termination button (not shown) provided on the operation input unit of the post-processing device 40 has been operated, the program proceeds to step ST 16. When the post-processing complete button has not been operated, the program proceeds to step ST 13. Thus, a new post-processing condition may be inputted or a new recording medium may be placed on the paper sheet feeding section n4. Then, the program enters a waiting status for waiting input of JOB information including the post-processing information and the recording medium placing information.

(ST 16)

ST 16 is a step for determining whether or not there is a startup request of the image forming device. In the present embodiment, the information control circuit 120 always, including the time while post-processing operation is conducted, checks whether or not the operation of the image-forming-device startup unit for requesting the startup of the image forming device 20 or the like has been conducted.

And when, for example, the user operates the image-forming-device startup button, not shown, as an image-forming-device startup unit, provided on the post-processing device 40, the information control circuit 120 determines that there has been a request for starting up the image forming device. In order to execute the image-forming-device startup mode to start up the image forming device to turn it into an operable status, the program proceeds to the step ST 10 after completing the post-processing operations.

In the present embodiment, taking account of the operability, the image-forming-device startup button is provided on the post-processing device to execute the image-forming-device startup mode when operating the image-forming-device startup button. However, it is apparent that the image-forming-device startup button may be provided on the operation input unit of the post-processing device or in the operation input unit 200 of the image forming device to set the image-forming-device startup mode.

When the image-forming-device startup button has not been operated; when the post-processing terminating button (not shown) has been operated via the operation input unit of the post processing device 40 or the operation input unit 200 of the image forming device 20; or when the power switch unit has been operated and the power has been cut off, then, for example, the information control circuit 120 transmits operation termination information to the CPU 110 of the image forming device 20; the CPU 40a of the post-processing device 40 operates the drive control circuit 40b so as to execute terminating operation for initializing various units constructing the post-processing unit 40c of the post-processing device 40; and then the CPU 110 cuts off the power of the power supply circuit 400 to terminate all the operations.

As described above, in the present embodiment, with the image forming system, which is capable of operating the image forming device as an image forming unit and the post-processing device as a post-processing unit with collaboration between them, when post-processing is to be performed on recording mediums by operating only the post-processing device, the power is turned on first of all in starting up the image forming device or the image forming system to startup the control circuit and the post-processing unit necessary for quickly turning the post-processing device into an operable state for post-processing, and particularly, operations which are not necessary to be started up, such as warm up of the fixing device of the image forming device, are not started. Thus, it is possible to shorten the startup time of the post processing device and to prevent the waste of the useless power energy.

Further, in the present embodiment, for a case where the user desires to execute image forming onto a recording medium in a state where only the post-processing device is operated, the image forming system is arranged to shorten the startup time of the image forming device by starting up the image forming device quickly after the operation of the post-processing is completed, with operating of the image-forming-device startup button provided on the post processing device.

The image forming device in the present embodiment as an image forming unit is to be a copier in order to simplify the explanation. However, it is apparent that the image forming device is not limited to the copier and may be a printer, a facsimile machine or a multiple apparatus.

What is claimed is:

1. An image forming system, comprising:
   an image forming device having an image forming section that forms an image on a recording medium based on image information and ejects the recording medium;
   a post-processing device that performs post-processing on the ejected recording medium, the post-processing device having a sheet feeding section to load the recording medium;
   a power switching device to turn on power to the image forming system;
   a post-processing operation setting device for setting a post-processing dedicated mode to execute the post-processing on the recording medium loaded on the sheet feeding section at an initial turning on power to the image forming system;
   a controller that executes startup operation for setting only the post-processing device into an operable state and prohibits startup operation of the image forming section of the image forming device when power has been turned on via the power switching device and the controller has detected that the post-processing dedicated mode has been set via the post-processing operation setting device; and
   a display unit that, at the initial turning on power to the image forming system, allows setting of a startup mode for startup of the image forming device and the post-processing device into an operable state, with a selection from a plurality of startup modes, and setting of a startup setting confirmation mode for confirmation of the startup mode having been set.

2. The image forming system of claim 1, wherein the plurality of startup modes include a normal startup mode that starts up the image forming device and the post-processing device into the operable state and the post-processing dedicated mode that starts up only the post-processing device into the operable state.

3. The image forming system of claim 2,
   wherein the controller determines whether the normal startup mode is selected, and if it is determined that the normal startup mode is selected, the controller performs:
   startup by the normal startup mode;
   image forming operation by the image forming device; and
   the post-processing by the post-processing device following the image forming operation.

4. The image forming system of claim 3,
   wherein the normal startup mode includes an initial setting mode; and
   wherein the controller performs in the initial setting mode:
   startup of the image forming device into an operable normal state that allows execution of the image forming operation;
   startup of the post-processing device into an operable normal state; and
   initial setting on necessary items through information exchange between the image forming device and the post-processing device so that the image forming device and the post-processing device can operate in collaboration with each other.

5. The image forming system of claim 1,
   wherein control of the image forming device and the post-processing device from external equipment via a network is allowed.

6. An image forming system, comprising:
   an image forming device having an image forming section that forms an image on a recording medium based on image information and ejects the recording medium;
   a post-processing device that performs post-processing on the ejected recording medium, the post-processing device having a sheet feeding section to load the recording medium;
   a power switching device to turn on power to the image forming system;
   a post-processing operation setting device for setting a post-processing dedicated mode to execute the post-processing on the recording medium loaded on the sheet feeding section at an initial turning on power to the image forming system; and
   a controller that executes startup operation for setting only the post-processing device into an operable state and prohibits startup operation of the image forming section of the image forming device when power has been turned on via the power switching device and the controller has detected that the post-processing dedicated mode has been set via the post-processing operation setting device;
   wherein, in order to execute post-processing operation such as to operate only the post-processing device, the controller executes a sleep mode that starts up the image forming device only for a part of the image forming device and prohibits startup operation which is unnecessary for the post-processing operation, and performs startup operation such that the post-processing device quickly turns into the operable state.

7. The image forming system of claim 6,
   wherein control of the image forming device and the post-processing device from external equipment via a network is allowed.

8. An image forming system, comprising:
   an image forming device having an image forming section that forms an image on a recording medium based on image information and ejects the recording medium;
   a post-processing device that performs post-processing on the ejected recording medium, the post-processing device having a sheet feeding section to load the recording medium;
   a power switching device to turn on power to the image forming system;
   a post-processing operation setting device for setting a post-processing dedicated mode to execute the post-processing on the recording medium loaded on the sheet feeding section at an initial turning on power to the image forming system;
   a controller that executes startup operation for setting only the post-processing device into an operable state and prohibits startup operation of the image forming section of the image forming device when power has been turned on via the power switching device and the controller has detected that the post-processing dedicated mode has been set via the post-processing operation setting device; and
   an image-forming-device startup unit for setting an image-forming-device startup mode for startup of the image forming device into an operable state,
   wherein, when the controller has detected that the image-forming-device startup mode has been set via the imageforming-device startup unit in a state where the post-processing dedicated mode is set, the controller executes the image-forming-device startup mode after completion of post-processing operation by the post-processing dedicated mode.

9. The image forming system of claim 8, wherein the image-forming-device startup unit is arranged on the post-processing device.

10. The image forming system of claim 8, wherein the image-forming-device startup mode includes an initial setting mode; and wherein the controller performs in the initial setting mode:

startup of the image forming device into an operable normal state that allows execution of image forming operation;

startup of the post-processing device into an operable normal state; and initial setting on necessary items through information exchange between the image forming device and the post-processing device so that the image forming device and the post-processing device can operate in collaboration with each other.

11. The image forming system of claim 8, wherein the controller always, including during post-processing operation, monitors whether the image-forming-device startup mode is set via the image-forming-device startup unit.

12. The image forming system of claim 8, wherein control of the image forming device and the post-processing device from external equipment via a network is allowed.

* * * * *